D. Eldridge,
Machine Gearing.
N° 49,614.　　　　　　　　　Patented Aug. 29, 1865.
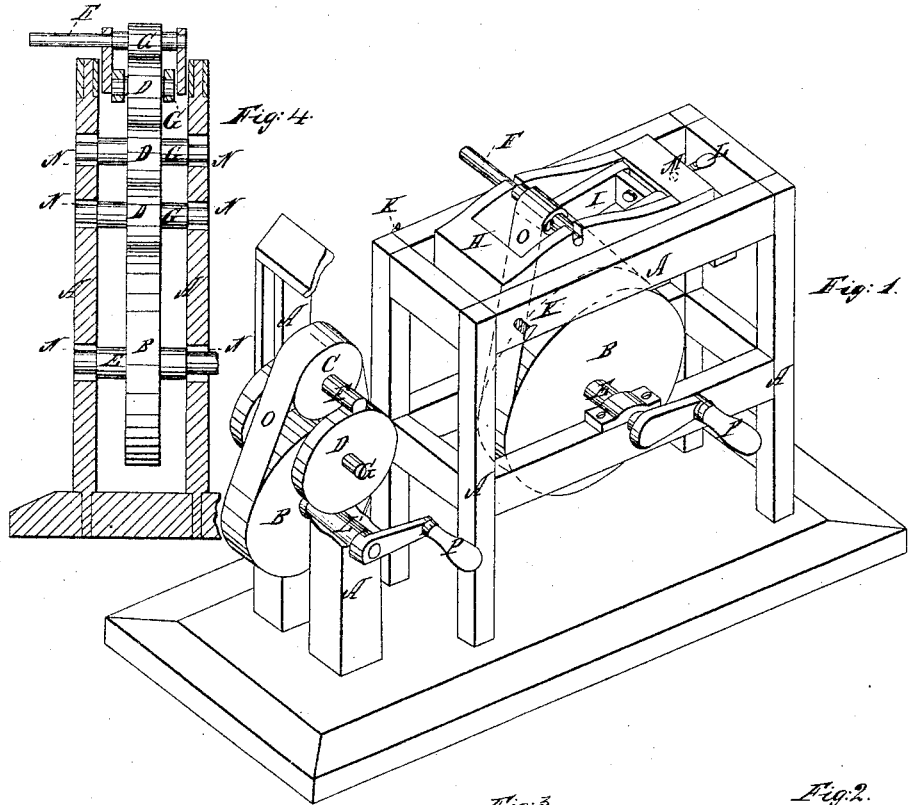
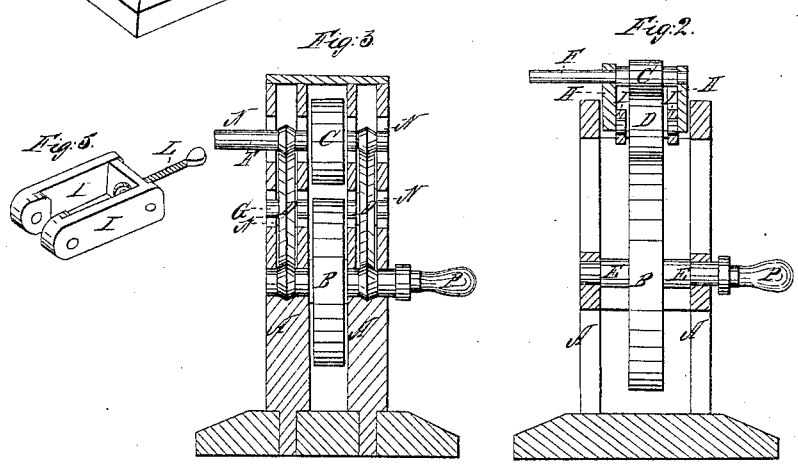
Witnesses:
Stephen Ustick
John White
Inventor:
David Eldridge

UNITED STATES PATENT OFFICE.

DAVID ELDRIDGE, OF PHILADELPHIA, PENNSYLVANIA.

IMPROVED ANTI-FRICTION WHEELS FOR BELT-GEARING.

Specification forming part of Letters Patent No. 49,614, dated August 29, 1865; antedated August 13, 1865.

*To all whom it may concern:*

Be it known that I, DAVID ELDRIDGE, of the city and county of Philadelphia, and State of Pennsylvania, have invented a new and Improved Arrangement of Anti-Friction Wheels for Belt-Gearing; and I do hereby declare that the following is a full, clear, and exact description of the construction and operation of the same, reference being had to the annexed drawings, making a part of this specification, in which—

Figure 1 is a perspective view of the arrangement of the invention, in which an anti-friction wheel is situated between the pulleys on the driving and driven shafts or first and second movers, and also a modification of the arrangement in which similar wheels are placed between the journals of the two shafts, so as to have a bearing upon each, both arrangements being represented in the same standing frame. Fig. 2 is a vertical section of the first arrangement. Fig. 3 is a like section of the second arrangement. Fig. 4 is a modification of the invention, similar to the first arrangement, with the exception that there are a plurality of wheels instead of one. Fig. 5 is a perspective view of the tightening-frame I of the first arrangement.

Like letters in all the figures represent the same parts.

The nature of my invention and improvement consists in combining an anti-friction wheel or wheels with the pulleys of a driving and driven shaft or first and second movers, or with the journals of said shafts, in such a manner as that the wheel or wheels shall have a rolling motion on the peripheries of the two pulleys or on the journals of the two shafts, as the case may be, so as to relieve the journals of the second mover of a great amount of friction, which is incidental to journals turning in rigid boxes.

To enable others skilled in the art to make and use my invention, I will proceed to describe its construction and operation.

A represents the standing frame in the different arrangements.

B is the driving-pulley, and C the driven pulley.

D represents the anti-friction wheels which are shown in Figs. 2, 3, and 4. In Fig. 2 there is a single wheel represented, which revolves on the peripheries of the pulleys B and C, but there is a plurality of wheels in Fig. 4. The object of this modification is to adapt the invention to pulleys which are so far apart as to make the use of a single wheel inconvenient. In Fig. 3 and in one arrangement in Fig. 4 the wheels bear on the peripheries of the journals of the two shafts instead of on the pulleys. A V-groove is represented in the peripheries of the wheels, and a corresponding annular elevation on the journals of the pulley-shafts, for the purpose of giving a steady motion to the running of the wheels. The wheels and journals may, however, have smooth peripheries, if preferred.

Instead of a single wheel at each end of the shafts there may be a plurality, as represented in Fig. 4, between the pulleys. E is the driving-shaft, and F the driven shaft or second mover.

G represents the shafts of the anti-friction wheels D. In the arrangement in which the said wheels bear on the peripheries of the pulleys, as seen in Figs. 1, 2, and 4, H represents a frame which sustains the driven pulley C, and I a frame within it, provided with an anti-friction wheel which supports the said pulley. The frame H is hung at one end on the screws K, as seen in Fig. 1, and is sustained at the other end by the set-screw M, which passes through a cross-piece of the standing frame A. The object of the screw is to adjust the pulley in the frame H to the anti-friction wheel beneath it, so that the journals may not touch on the bottoms of the rigid boxes.

The set-screw L is to regulate the anti-friction wheel D and place it on a line with the shafts E and F. It can be used in some measure to tighten the belt O.

The frame I is made flexible, as represented in Fig. 5, to readily adapt the wheel D to the pulleys B and C. The flexibility of the frame is, however, by no means indispensable, as the same effect may readily be accomplished without it.

The journals of the shafts of the anti-friction wheels D, and also those of the driven pulley C, turn in elongated holes or slots N, so as to not bind above and below the slots, merely keeping them in their perpendicular position, so as to avoid any friction on the journals, except the small amount which results from their slight contact with the perpendicular edges of the said slots.

When the wheel D is placed in the frame I the elongation of the holes which its journals run in is not necessary; but the frame should be made as light as possible to avoid much weight on the journals.

It will readily be seen that there are two important advantages resulting from the use of my invention—viz., first, the dispensing with a great amount of friction of the journals of the shaft of the driven pulley by having the pulley or the journals of its shaft to revolve on the wheel or wheels D, thereby dispensing with nearly all of the friction of the journals, as above stated. The second advantage results from the weight of the driven pulley and shaft and strain of the belt acting upon the anti-friction wheel or wheels, according to the amount of the weight and strain, so as to give a binding force equivalent thereto to the periphery of the pulley, and thus reducing the requisite width and length of the belt.

Having thus fully described the construction and operation of my improved arrangements of anti-friction wheels for belt-gearing, what I claim therein as new, and desire to secure by Letters Patent, is—

The arrangement of an anti-friction wheel or wheels between the driving and driven pulleys or between the journals of their shafts, so that the periphery of the wheel or wheels shall have a continuous rolling motion on the peripheries of the said pulleys or journals, as the case may be, substantially in the manner described, and for the purpose set forth.

DAVID ELDRIDGE.

Witnesses:
STEPHEN USTICK,
JOHN WHITE.